US009805429B2

(12) United States Patent
Elias et al.

(10) Patent No.: US 9,805,429 B2
(45) Date of Patent: *Oct. 31, 2017

(54) SYSTEM AND METHODS FOR ANALYZING DOCUMENTS

(71) Applicant: LexisNexis, a division of Reed Elsevier Inc., Miamisburg, OH (US)

(72) Inventors: Brian K. Elias, Springboro, OH (US); Matthew C. Morrise, Portland, OR (US); Om Chauhan, Edison, NJ (US); Ningjun Wang, Edison, NJ (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,092

(22) Filed: May 19, 2016

(65) Prior Publication Data

US 2016/0267613 A1    Sep. 15, 2016

Related U.S. Application Data

(63) Continuation of application No. 12/149,784, filed on May 8, 2008, now Pat. No. 9,372,923.

(51) Int. Cl.
    *G06F 17/30*    (2006.01)
    *G06Q 50/18*    (2012.01)
    (Continued)

(52) U.S. Cl.
    CPC ..... *G06Q 50/184* (2013.01); *G06F 17/30684* (2013.01); *G06F 17/30707* (2013.01);
    (Continued)

(58) Field of Classification Search
    CPC ......... G06F 17/30684; G06F 17/30719; G06F 17/30728; G06F 17/30707
    See application file for complete search history.

(56) References Cited

U.S. PATENT DOCUMENTS 5,144,679 A    9/1992    Kakumoto et al.
5,159,552 A    10/1992   van Gasteren et al.
(Continued)

FOREIGN PATENT DOCUMENTS

EP    2156271       2/2010
JP    2003308318    10/2003
(Continued)

OTHER PUBLICATIONS

Office Action mailed on Nov. 16, 2015 in Canadian Patent Application No. 2,686,900.

(Continued)

*Primary Examiner* — James Trujillo
*Assistant Examiner* — Hubert Cheung
(74) *Attorney, Agent, or Firm* — Dinsmore & Shohl LLP

(57) ABSTRACT

Systems and methods are provided for analyzing documents. In one implementation, a computer implemented method is provided for analyzing a patent application and providing a visual representation. According to the method, a selection is received from a user to view claims of the patent application in a claim tree hierarchy and a computer displays the claims in the claim tree hierarchy on a display. The claim tree hierarchy visually depicts relationships between the claims. The method identifies one or more words of at least one of the claims that constitutes an element and displays, in the claim tree hierarchy, the words constituting the element in association with the claim.

26 Claims, 17 Drawing Sheets

(51) Int. Cl.
*H04W 4/02* (2009.01)
*H04L 29/08* (2006.01)

(52) U.S. Cl.
CPC .. *G06F 17/30719* (2013.01); *G06F 17/30728* (2013.01); *H04L 67/18* (2013.01); *H04W 4/02* (2013.01); *G06F 2216/11* (2013.01)

(56) References Cited

U.S. PATENT DOCUMENTS

| | | | |
|---|---|---|---|
| 5,623,679 | A | 4/1997 | Rivette et al. |
| 5,623,681 | A | 4/1997 | Rivette et al. |
| 5,754,840 | A | 5/1998 | Rivette et al. |
| 5,774,833 | A | 6/1998 | Newman |
| 5,799,325 | A | 8/1998 | Rivette et al. |
| 5,806,079 | A | 9/1998 | Rivette et al. |
| 5,809,318 | A | 9/1998 | Rivette et al. |
| 5,845,301 | A | 12/1998 | Rivette et al. |
| 5,991,751 | A | 11/1999 | Rivette et al. |
| 6,002,798 | A | 12/1999 | Palmer et al. |
| 6,014,663 | A | 1/2000 | Rivette et al. |
| 6,038,561 | A | 3/2000 | Snyder et al. |
| 6,574,645 | B2 | 6/2003 | Petruzzi et al. |
| 6,793,429 | B2 | 9/2004 | Arrison |
| 7,296,015 | B2 | 11/2007 | Poltorak |
| 7,412,441 | B2 | 8/2008 | Scott et al. |
| 7,444,589 | B2 | 10/2008 | Zellner |
| 7,516,492 | B1 | 4/2009 | Nisbet et al. |
| 7,533,096 | B2 | 5/2009 | Rice et al. |
| 7,593,920 | B2 | 9/2009 | Jackson et al. |
| 7,716,581 | B2 | 5/2010 | Tran |
| 7,801,909 | B2 | 9/2010 | Poltorak |
| 7,853,572 | B2 | 12/2010 | Lundberg et al. |
| 7,890,851 | B1 | 2/2011 | Milton et al. |
| 7,921,126 | B2 * | 4/2011 | Liao ............ G06F 17/27 707/755 |
| 7,941,468 | B2 | 5/2011 | Zellner et al. |
| 8,037,075 | B2 | 10/2011 | Millett |
| 8,160,306 | B1 | 4/2012 | Neustel |
| 8,312,067 | B2 | 11/2012 | Elias et al. |
| 2001/0049707 | A1 | 12/2001 | Tran |
| 2002/0042784 | A1 * | 4/2002 | Kerven ........... G06F 17/30672 706/12 |
| 2002/0120647 | A1 | 8/2002 | Amano |
| 2003/0046277 | A1 | 3/2003 | Jackson et al. |
| 2003/0115115 | A1 | 6/2003 | Ouchi |
| 2003/0212527 | A1 | 11/2003 | Moore et al. |
| 2003/0220897 | A1 | 11/2003 | Lee et al. |
| 2003/0229470 | A1 | 12/2003 | Pejic |
| 2004/0059994 | A1 | 3/2004 | Fogel et al. |
| 2004/0068453 | A1 | 4/2004 | Duan et al. |
| 2004/0068529 | A1 | 4/2004 | Pai |
| 2004/0078192 | A1 | 4/2004 | Poltorak |
| 2004/0078361 | A1 | 4/2004 | Hu et al. |
| 2004/0078365 | A1 | 4/2004 | Poltorak |
| 2004/0083432 | A1 | 4/2004 | Kawamura et al. |
| 2004/0098673 | A1 | 5/2004 | Riddoch et al. |
| 2004/0123235 | A1 | 6/2004 | Yeh et al. |
| 2004/0176115 | A1 | 9/2004 | Atkin et al. |
| 2005/0005239 | A1 | 1/2005 | Richards |
| 2005/0010863 | A1 | 1/2005 | Zernik |
| 2005/0097464 | A1 | 5/2005 | Graeber |
| 2005/0108652 | A1 * | 5/2005 | Beretich, Jr. ......... G06F 17/271 715/764 |
| 2005/0125744 | A1 | 6/2005 | Hubbard et al. |
| 2005/0144206 | A1 | 6/2005 | Baumann |
| 2005/0210008 | A1 | 9/2005 | Tran et al. |
| 2005/0210042 | A1 | 9/2005 | Goedken |
| 2005/0234685 | A1 | 10/2005 | Tanigawa |
| 2005/0261891 | A1 | 11/2005 | Chan et al. |
| 2006/0047676 | A1 | 3/2006 | Ouchi |
| 2006/0190807 | A1 | 8/2006 | Tran |
| 2006/0271522 | A1 | 11/2006 | Scott et al. |
| 2007/0016431 | A1 * | 1/2007 | Desai ............ G06Q 90/00 705/310 |
| 2007/0055485 | A1 | 3/2007 | Kierzenka et al. |
| 2007/0073653 | A1 * | 3/2007 | Raab ............... G06F 17/30654 |
| 2007/0078886 | A1 | 4/2007 | Rivette et al. |
| 2007/0198578 | A1 | 8/2007 | Lundberg et al. |
| 2007/0208764 | A1 | 9/2007 | Grisinger |
| 2007/0226250 | A1 * | 9/2007 | Mueller ............ G06Q 10/087 |
| 2007/0239706 | A1 | 10/2007 | Zhang et al. |
| 2007/0276796 | A1 | 11/2007 | Sampson |
| 2007/0288256 | A1 * | 12/2007 | Speier ................ G06Q 10/10 715/208 |
| 2008/0016445 | A1 | 1/2008 | Dykes et al. |
| 2008/0033736 | A1 | 2/2008 | Bulman |
| 2008/0114668 | A1 | 5/2008 | Peters et al. |
| 2008/0124050 | A1 | 5/2008 | Deschamp et al. |
| 2008/0147656 | A1 * | 6/2008 | Kahn ................ G06Q 10/10 |
| 2008/0183518 | A1 | 7/2008 | Jiang et al. |
| 2008/0243979 | A1 | 10/2008 | Cherkauer et al. |
| 2008/0247532 | A1 | 10/2008 | Schulz |
| 2008/0270255 | A1 | 10/2008 | Milone et al. |
| 2008/0281860 | A1 | 11/2008 | Elias et al. |
| 2009/0019355 | A1 | 1/2009 | Jiang et al. |
| 2009/0070301 | A1 | 3/2009 | McLean et al. |
| 2009/0077124 | A1 | 3/2009 | Spivack et al. |
| 2009/0138466 | A1 | 5/2009 | Henry et al. |
| 2009/0157679 | A1 | 6/2009 | Elias et al. |
| 2009/0210828 | A1 | 8/2009 | Kahn |
| 2009/0228777 | A1 | 9/2009 | Henry et al. |
| 2009/0276694 | A1 | 11/2009 | Henry et al. |
| 2010/0191748 | A1 | 7/2010 | Martin et al. |
| 2010/0287478 | A1 | 11/2010 | Avasarala et al. |
| 2011/0072342 | A1 | 3/2011 | Tran |
| 2011/0307499 | A1 | 12/2011 | Elias et al. |
| 2013/0013295 | A1 * | 1/2013 | Lee .................. G06Q 10/06 704/9 |

FOREIGN PATENT DOCUMENTS

| | | |
|---|---|---|
| JP | 2003323322 | 11/2003 |
| JP | 2006065882 | 3/2006 |
| JP | 2010527067 | 8/2010 |
| WO | 2008140721 | 11/2008 |
| WO | 2009079357 | 6/2009 |
| WO | 2011156134 | 12/2011 |

OTHER PUBLICATIONS

Office Action of Jul. 5, 2013 filed in Japanese Patent Application No. 2010-507444.
Examination Report Dated Apr. 4, 2013, filed in European Application No. 08 754 231.2-1955.
Notice of Rejection, dated Feb. 22, 2013, for Japanese Application No. 2010-507444 (13 pages).
Notification of Transmittal of the International Search Report and the Written Opinion of the International Searching Authority in International Application No. PCT/US08/05859, mailed Oct. 23, 2008.
Kazuya Konishi et al., "A Support Function of Understanding Patent Claims for Efficient Patent Investigation," Jun. 2006 (10 pages).
Notification of Transmittal of the International Search Report and the Written Opinion of the International Searching Authority in International Application No. PCT/US11/37863, mailed Aug. 30, 2011 (14 pages).
Office Action, mailed Apr. 19, 2013, in U.S. Appl. No. 12/813,976, filed Jun. 10, 2010.
Office Action, mailed Nov. 6, 2012, in U.S. Appl. No. 12/813,976, filed Jun. 10, 2010.
Office Action, dated Jun. 12, 2012, in U.S. Appl. No. 12/813,976, filed Jun. 11, 2010 (10 pages).
Novak, "Conversion of Unites of Measurement," IEEE Transaction on Software Engineering, vol. 21, No. 8, Aug. 1995, pp. 651-661.
Schulz, "Writing Applications for Uniform Operation on a Mainframe or PC: A Metric Conversion Program," Association for Computing Machinery, 1990, pp. 348-361.

(56) References Cited

OTHER PUBLICATIONS communication, in European Application No. 08 754 231.2-1238, dated Aug. 23, 2011 (1 page).
Supplementary European Search Report, In European Application No. 08 754 231.2-1238, dated Jul. 28, 2011 (5 pages).
International Preliminary Report on Patentability, for International Application No. PCT/US2008/005859, dated Nov. 19, 2009 (2 pages).
International Preliminary Report on Patentability, for International Application No. PCT/US2008/086540, dated Jun. 24, 2010 (7 pages).
International Search Report and Written Opinion, for International Application No. PCT/US2008/086540, dated Mar. 9, 2009 (13 pages).
International Search Report and Written Opinion, for International Application No. PCT/US2011/37863, dated Aug. 30, 2011 (9 pages).
Office Action, dated Mar. 3, 2011, in U.S. Appl. No. 12/314,592, filed Dec. 12, 2008 (7 pages).
Office Action, dated Aug. 8, 2011, in U.S. Appl. No. 12/314,592, filed Dec. 12, 2008 (9 pages).
Office Action, dated Dec. 13, 2011, in U.S. Appl. No. 12/314,592, filed Dec. 12, 2008 (10 pages).

\* cited by examiner

SYSTEM AND METHODS FOR ANALYZING DOCUMENTS

RELATED APPLICATION

This application is a continuation of U.S. patent application Ser. No. 12/149,784, entitled "Systems and Methods for Analyzing Documents", and filed on May 8, 2008, which claims the benefit of priority from U.S. Provisional Application No. 60/924,310, entitled "Document Analysis Tool and Method," filed May 9, 2007, the disclosures of which are expressly incorporated herein by reference in their respective entireties.

BACKGROUND

I. Technical Field

The present invention generally relates to the field of computerized systems. More particularly, the invention relates to computerized systems and methods for analyzing documents.

II. Background Information

Many kinds of documents, such as legal documents, require consistency and precision in the selection and use of words throughout the documents. Whether preparing a document or evaluating an existing document, understanding the meaning of the document's words may be of great importance. For example, at some future time, it may be necessary to understand and interpret the document's words and the meaning that is applied to the words may have significance to a variety of parties.

Analyzing whether a document uses words in a consistent and clear manner can take a substantial amount of time, particularly when the document is complex. For example, an individual preparing or studying a document may want to understand how certain words in the document have been used in other documents or understand relationships between terms used in the document and certain sections of the document. For example, when drafting a legal document, it is desirable to use consistent terminology through the document because, at a later time, the meaning of the document's words may be important. Furthermore, an individual preparing a legal document may want to know how the words used in the document have been interpreted in the past, such as the meaning that has been given to the words by courts.

Checking a document for consistency or researching and comparing a document against a large number of sources are often complex and time consuming tasks. Moreover, determining relationships between parts of the document and its terminology can also be time consuming and tedious. As is evident from the foregoing, there is a need for improved systems and methods for analyzing documents.

SUMMARY

Consistent with a disclosed embodiment, a computer-implemented method is provided for analyzing a patent application and providing a visual representation. The method may comprise receiving a selection from a user to view claims of the patent application in a claim tree hierarchy and displaying, by a computer, the claims in the claim tree hierarchy on a display. The claim tree hierarchy may visually depict relationships between the claims. The method may further identify one or more words of at least one of the claims that constitutes an element and display, in the claim tree hierarchy, the words constituting the element in association with the claim.

Consistent with another disclosed embodiment, a computer-implemented method is provided for evaluating accuracy of a document. The method may comprise receiving a selection from a user to check part numbers in a document, determining words in the document that are associated with part numbers and determining whether one or more words in the document are missing part numbers. When one or more words in the document are missing part numbers, the method may display one more suggested part numbers for the one or more words. The method may further receiving from a user a selection to insert the one more suggested part numbers into the document.

Consistent with another disclosed embodiment, a computer-implemented method is provided for converting a measurement expressed in a first measurement system in a document. The method may comprise identifying the measurement in the document, determining a conversion of the measurement into a second measurement system, receiving input from a user to insert the conversion of the measurement into the document, and inserting the conversion and corresponding units into the document.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
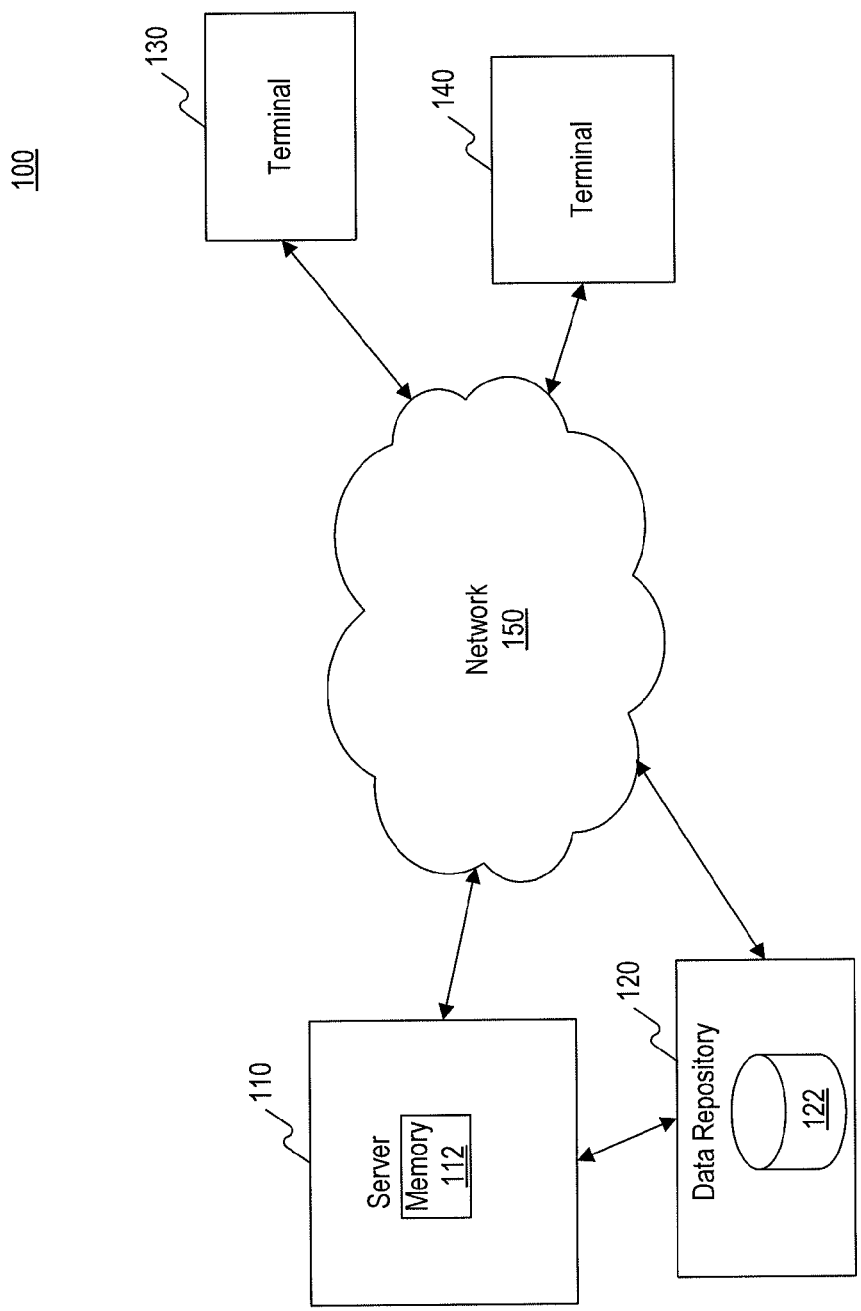
FIG. 1 is an example of a system for analyzing documents, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Embodiments disclosed herein provide computer-implemented systems and methods for analyzing documents. Although the following discussion may refer to various legal documents, such as patents, patent applications, and contracts as examples, one of ordinary skill in the art will understand that systems and methods consistent with the disclosed embodiments may analyze any kind of document.

In the context of patents or patent applications, as used herein, an "element" shall mean a component of an invention that is found in a claims section of a patent application and a "part" shall mean a component of an invention found in a description section of a patent application. As used herein, a "phrase" may include elements, parts, or structural components of an invention. In the context of documents, in general, the terms "element," "part," and "phrase" may refer to any word or words in a document. A "term" shall constitute language that is used in a document in a specific way to mean a certain thing.

Disclosed embodiments may allow an individual preparing or evaluating a document to research terms appearing in the document. For example, systems and methods consistent with disclosed embodiments may detect terms in a document, generate a list of the terms, and provide functionality for selecting terms for further research. Embodiments may allow an individual preparing or evaluating a document to retrieve other documents (e.g., court opinions, patents, or patent applications, etc.) that have defined the terms that appear in the document of interest. Furthermore, terms and/or results of the research may be formatted into a report for inclusion in the document or that may serve as a standalone report document.

Other disclosed embodiments may generate a hierarchy (e.g., a claim hierarchy) of words, terms, or elements that are used in a document. Systems and methods disclosed herein may display the hierarchy in a visual representation. Furthermore, an individual may research words, terms, or elements that appear in a claims section of a patent or patent application or sections of a contract. Research may be stored in association with related words, terms, or elements. Additional disclosed embodiments may check the accuracy and consistency of reference figures and related numbers/labels of a document (e.g., a patent or patent application), insert part numbers for parts appearing in a document, enable an individual preparing a document to use shorthand notations while drafting the document, and validate and convert measurements appearing in a document.

FIG. 1 is an example of a system 100 for analyzing documents, consistent with a disclosed embodiment. As shown in system 100, server 110, data repository 120, and terminals 130 and 140 are connected to a network 150. Although a specific numbers of servers and two terminals are depicted in FIG. 1, any number of these devices may be provided. Furthermore, the functions provided by one or more devices of system 100 may be combined and the functionality of any one or more components of system 100 may be implemented by any appropriate computing environment.

Network 150 facilitates communications between the various devices in system 100, such as server 110, data repository server 120, and terminals 130 and 140. In addition, server 110 may access legacy systems (not shown) via network 150, or may directly access legacy systems, databases, or other network applications. Network 150 may be a shared, public, or private network, may encompass a wide area or local area, and may be implemented through any suitable combination of wired and/or wireless communication networks. Furthermore, network 150 may comprise a local area network (LAN), a wide area network (WAN), an intranet, or the Internet.

Server 110 may comprise a computer (e.g., a personal computer, network computer, server, or mainframe computer) having one or more processors (not shown) that may be selectively activated or reconfigured by a computer program. Furthermore, server 110 may distribute data for parallel processing by one or more additional servers (not shown). Server 110 may also be implemented in a distributed network. Alternatively, server 110 may be specially constructed for carrying-out methods consistent with disclosed embodiments.

Server 110 may include a memory 112 for storing program modules that, when executed by a processor, perform one or more processes for analyzing documents, as discussed in detail below. Memory 112 may be one or more memory devices that store data as well as software and may also comprise, for example, one or more of RAM, ROM, magnetic storage, or optical storage. Since disclosed embodiments may be implemented using an HTTPS (hypertext transfer protocol secure) environment, data transfer over a network, such as the Internet, may be done in a secure fashion.

Data repository 120 may include a database 122 that stores data records for various subject matter including patents, patent applications, court opinions, articles, and other documents, etc. Furthermore, although one database is shown in FIG. 1, data repository may include more than one database. Data repository 120 may receive data from server 110, terminals 130-140, and/or other servers (not shown) available via network 150. Although shown as separate entities in FIG. 1, server 110 and data repository server 120 may be combined. For example, server 110 may include one or more databases in addition to or instead of data repository 120. Furthermore, server 110 and data repository 120 may exchange data directly or via network 150.

Terminals 130-140 may be any type of device for communicating with server 110 and/or data repository 120 over network 150. For example, terminals 130 140 may be personal computers, handheld devices, or any other appropriate computing platform or device capable of exchanging data with network 150. Terminals 130-140 may each include a processor (not shown) and a memory (not shown). Furthermore, terminals 130-140 may execute program modules that provide one or more graphical user interfaces (GUIs) for interacting with network resources and/or accessing server 110. Alternatively, or in addition, terminals 130-140 may locally execute program modules providing GUIs for analyzing documents and process the documents locally without the use of server 110.

Figure 2:
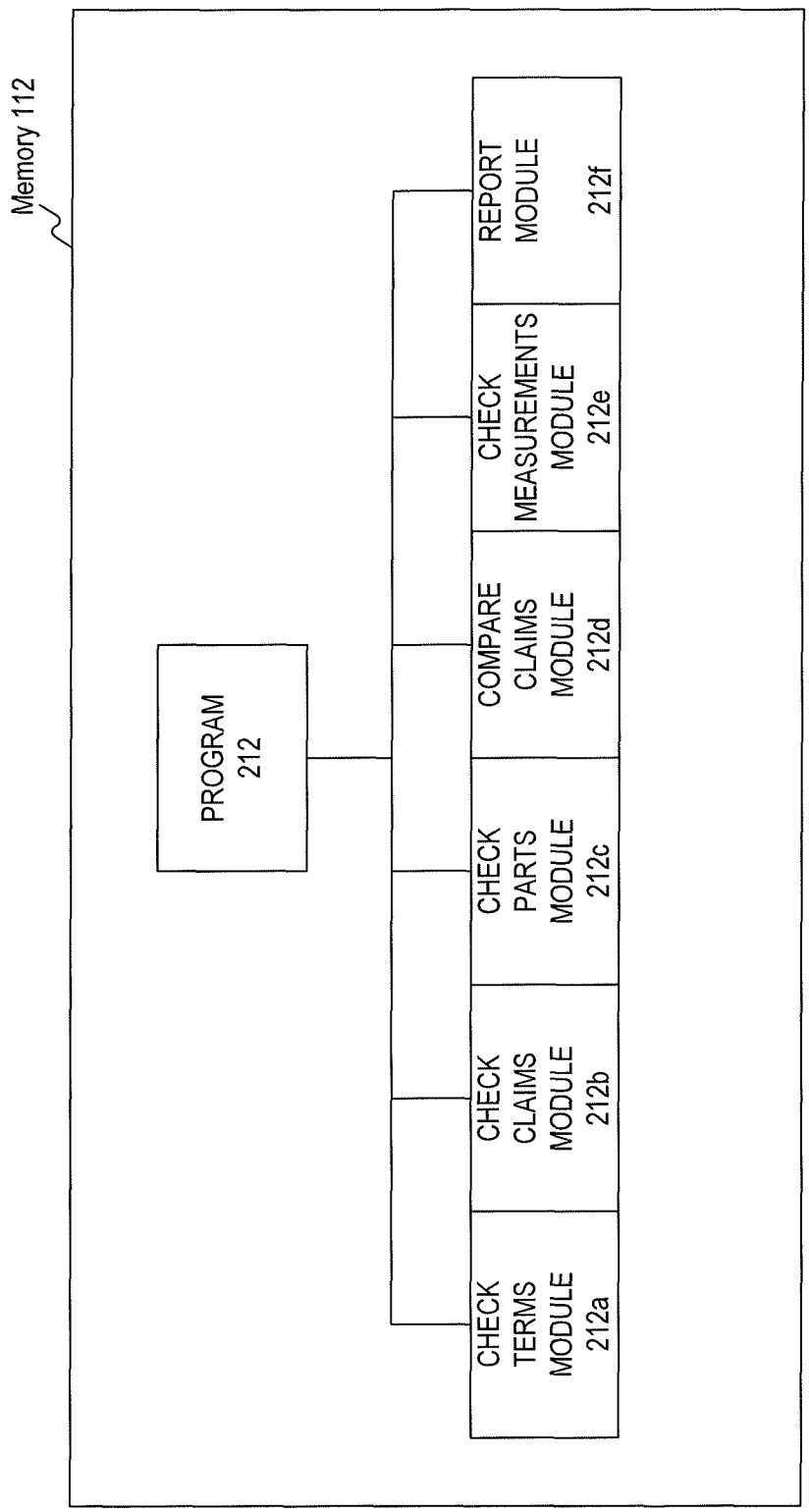
FIG. 2 is an exemplary software architecture for analyzing documents, consistent with a disclosed embodiment.

FIG. 2 is an exemplary software architecture for analyzing documents, consistent with a disclosed embodiment. The software architecture may be stored in memory 112 of server 110, as shown in FIG. 1, for example, or in memory (not shown) included in any one of terminals 130 and 140.

In one embodiment, memory 112 may store instructions of program 212, which when executed, perform one or more data processes for analyzing documents. To do so, program 212 may include instructions in the form of one or more program modules 212a-212f. Program modules 212a-212f may be written using any known programming language, such as C++, Java, etc., and may include a check terms module 212a, a check claims module 212b, a check parts module 212c, a compare claims module 212d, a check measurements module 212e, and a report module 212f.

Check terms module 212a may provide functionality for checking terms of a document, such as a patent or patent application. Check terms module 212a may generate user interfaces providing options for assisting a user to refine and validate terminology throughout a document (e.g., such as a patent or patent application). For example, check terms module 212a may provide functionality for determining a wide range of term characteristics, such as how a term has been used in other documents (e.g., prior usage); how a term has been interpreted by courts (e.g., case references); what other terms may be used in place of a term (e.g., alternate terms); and custom definitions that may define a term from a user's dictionary. Furthermore, check terms module 212a may provide functionality for linking to an external server (e.g., server 110) to retrieve and view documents in which a specific term appears; navigate to a location of any term within a retrieved document; and select individual terms and generate a report of their usage.

Check claims module 212b may provide functionality for checking claims of a patent or patent application. For example, check claims module 212b may provide functionality for displaying claims of a patent or patent application in a hierarchical structure. Check parts module 212c may provide functionality for detected unnumbered parts in a document, and allow a user to insert suggested part numbers into the document. Compare claims module 212d may provide functionality for displaying a comparison of two or more selected documents. Check measurements module 212e may provide functionality for identifying incorrect measurement conversions and for converting measurements to other units or systems. Report module 212f may provide functionality for generating a variety of reports, which are discussed below in further detail.

Although program modules 212a-212f have been described above as being separate modules, one of ordinary skill in the art will recognize that functionalities provided by one or more modules may be combined or distributed other logical configurations.

Figure 3:
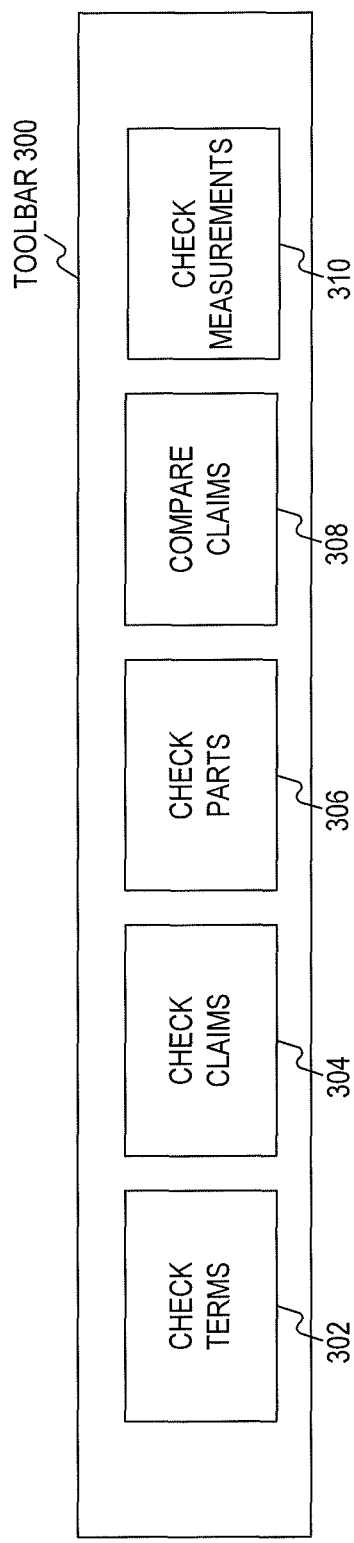
FIG. 3 is an exemplary toolbar, consistent with a disclosed embodiment.

FIG. 3 shows an exemplary toolbar 300, consistent with a disclosed embodiment. Toolbar 300 may be installed as part of a graphical user interface (GUI) for an application (e.g., a word processing application or an Internet browser). For example, an individual preparing a document with a word processing application may access toolbar 300 as part of functionality options that are made available while preparing and/or viewing a document using a word processing application. Furthermore, an individual viewing a document with an Internet browser may access toolbar 300 as part of functionality options that are available when viewing a document.

Toolbar 300 may include a variety of buttons, such as those shown in FIG. 3. For example, toolbar 300 may include a "Check Terms" button 302, a "Check Claims" button 304, a "Check Parts" button 306, a "Compare Claims" button 308, and a "Check Measurements" button 310. Selecting or clicking on one of buttons 302-310 may launch an appropriate dialog providing functionality for performing a variety of processes related to analyzing a document, as discussed below in further detail.

Checking Terms and Phrases of a Document

Figure 4:
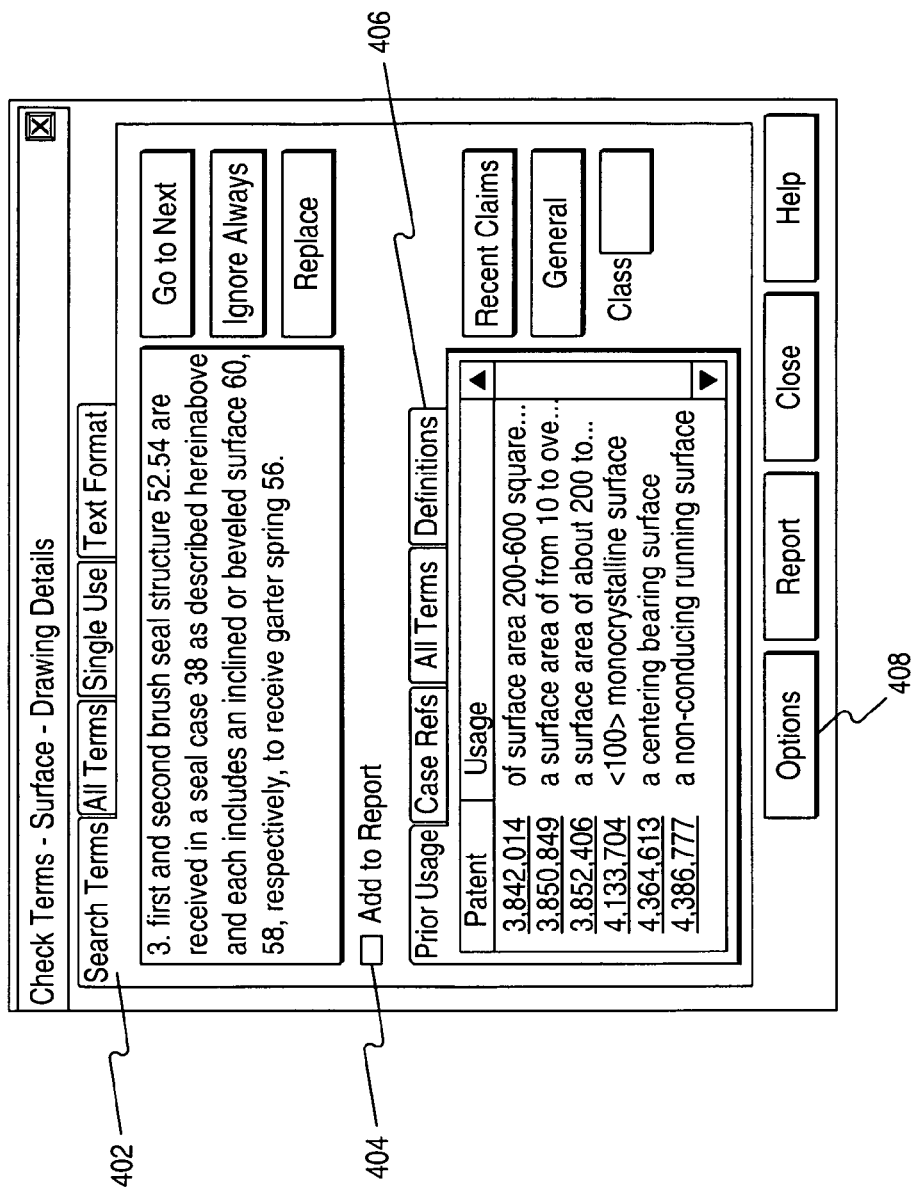
FIG. 4 is an exemplary user interface for checking terms and phrases, consistent with a disclosed embodiment.

FIG. 4 is a screenshot of an exemplary user interface 400 for checking terms and phrases, consistent with a disclosed embodiment. When selecting, for example, "Check Terms" button 302 from toolbar 300, user interface 400 may be displayed on one of terminals 130 and 140 and provide functionality according to, for example, program module 212a. To check term usage in a document, a user may select check terms button 302 or may select a check terms option from a menu (not shown) generated by an application (e.g., a word processing application or an Internet browser). When the check terms functionality is selected, one or more databases may be loaded into memory of one of terminals 130 and 140 and user interface 400 may be displayed. For example, the databases may be loaded by check terms module 212a from memory (not shown) of one of terminals 130 and 140 and/or may be loaded by check terms module 212a from server 110.

Figure 5:
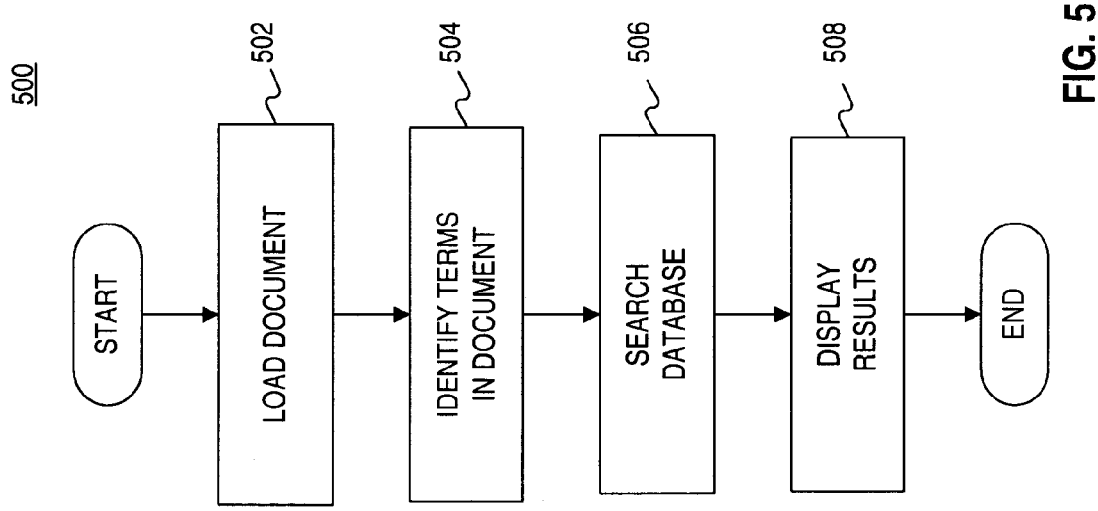
FIG. 5 is a flow diagram of an exemplary method for searching terms of a document, consistent with a disclosed embodiment.

FIG. 5 is a flow diagram 500 of an exemplary method for searching terms of a document, consistent with a disclosed embodiment. In step 502, a document is loaded by an application (e.g., a word processing application or an Internet browser). Next, in step 504, check terms module 212a may identify terms in the document. Check terms module 212a may identify terms using any appropriate algorithm, taken into account, for example, repetition and filtering out commonly used words or words of a certain type (e.g., verbs, adverbs, etc.). Furthermore, in user interface 400, a "Search Terms" tab 402 may display terms that have been identified in the document. Next, in step 506, check terms module 212a may load databases into local memory, as discussed above, and determine whether any of the identified terms occur in documents stored in the databases. In step 508, check terms module 212a may generate results, which may be displayed in user interface 400 by, for example, displaying terms in a particular color or with an icon to signify certain information. Terms having corresponding prior usage or suggested alternate terms information may be displayed in blue. Terms having corresponding case reference information may be displayed in red regardless of other information available (e.g., prior usage or suggested alternate terms).

To add terms to a report, a user may use "Search Terms" tab 402 and click on an "Add to Report" check box 404 in order to mark the term for inclusion in a report. Reports are discussed below in further detail.

To check for definitions of identified terms in a document, a user may select a term. For example, the user may click on a desired term and, if there are potential alternate terms, text in a "Definitions" tab 406 at the bottom of user interface 400 will appear. A user may click on "Definitions" tab 406 to view data displayed in a further window associated with the tab.

Figure 6:
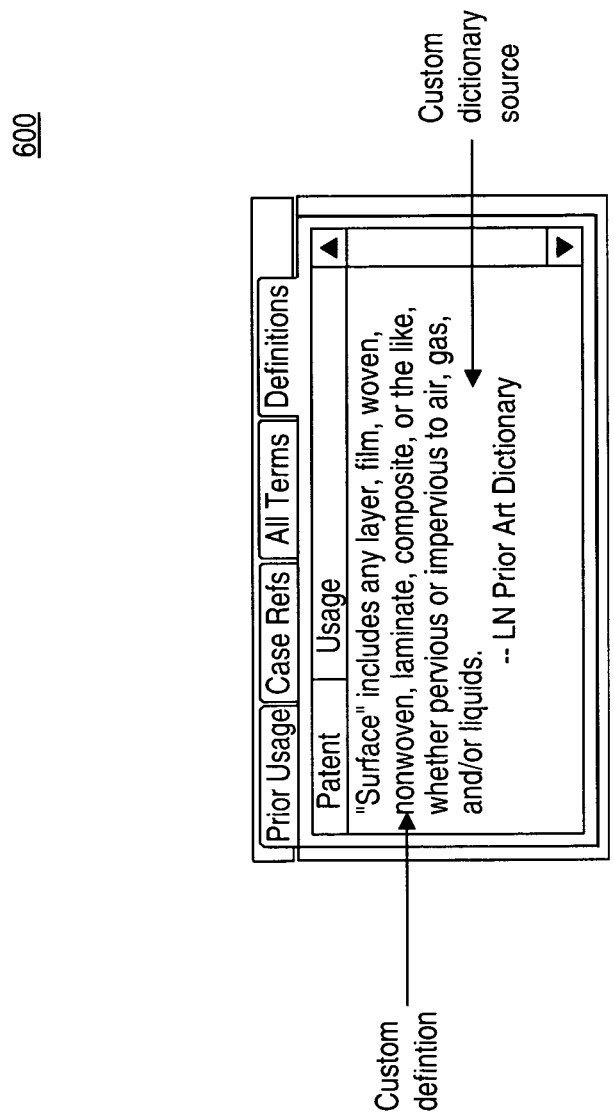
FIG. 6 is an exemplary user interface showing definitions information, consistent with a disclosed embodiment.

FIG. 6 shows an exemplary user interface 600 for "Definitions" tab 406, consistent with a disclosed embodiment. A custom definition or custom definitions may be displayed in user interface 600. Furthermore, a name of a source of the custom dictionary may appear below a custom definition. Custom dictionaries are discussed below in further detail.

Generating a Report of Terms in a Document

Figure 7:
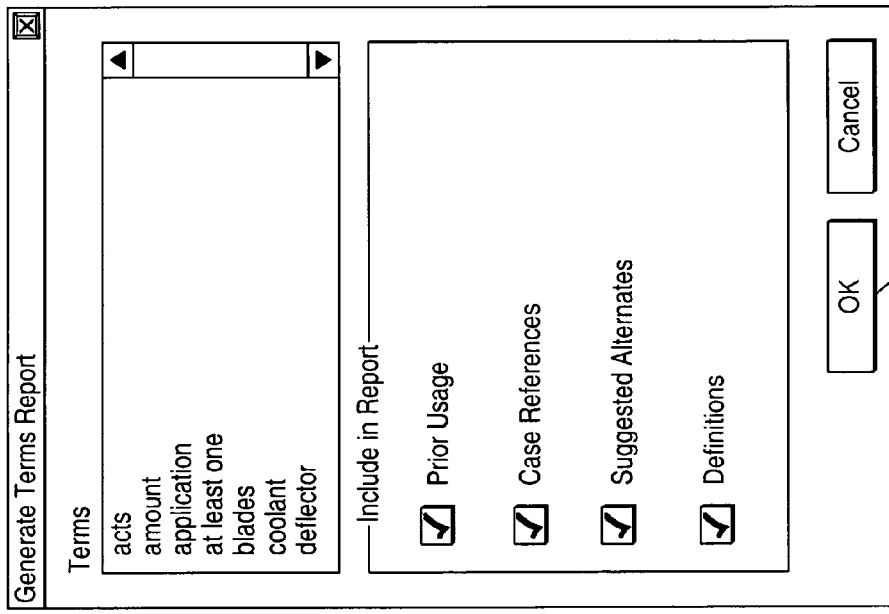
FIG. 7 is an exemplary user interface for generating a report of terms used within a document, consistent with a disclosed embodiment.

FIG. 7 is a screenshot of an exemplary user interface 700 for generating a report of terms used within a document, consistent with a disclosed embodiment. User interface 700 may be used create customized, printable reports of term usage in a document. For example, a new document may be created that includes the terms were marked using "Search Terms" tab 402 and relevant information retrieved from reference resources. The completed document may be saved and/or printed. To select terms, a user may highlight or select one term or may select a plurality of terms.

To generate a report of selected terms, a user may select a "Report" button 408 in user interface 400, as shown in FIG. 4. Report module 212*f* may generate user interface 700, which may include one or more check boxes that the user may use to specify the types of references to include in the report. A use may select by, for example, clicking any of the check boxes to deselect a type of cross-reference to be excluded from the report. For example, a checked box may indicate that the reference type will be included and an unchecked box may indicate the reference type will not be included. By selecting an "OK" button 702, report module 212*f* may generate the report. Accordingly, a new document may be created containing prior usage (e.g., by searching a particular dictionary), case references (e.g., by searching court opinions), suggested alternate terms (e.g., by searching a thesaurus), and custom definitions (e.g., by searching a user-defined dictionary).

Figure 8:
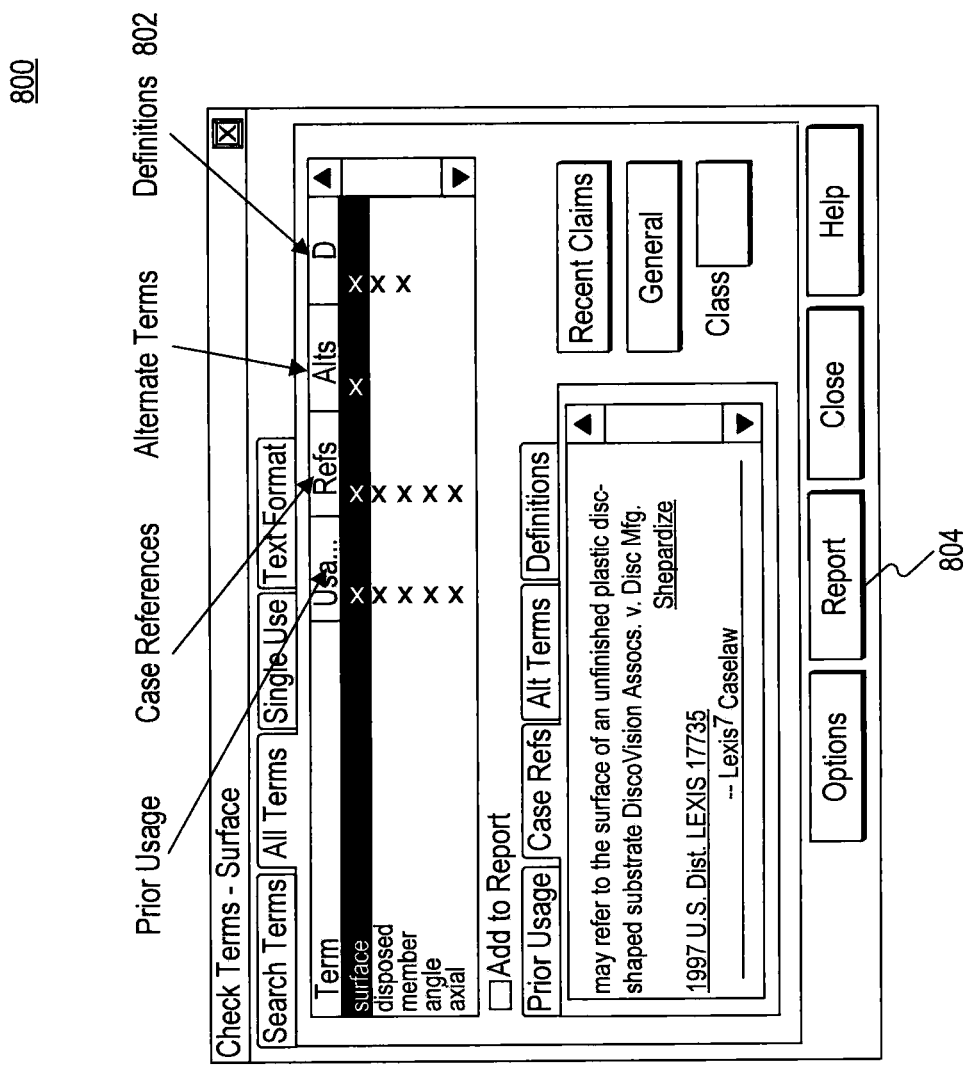
FIG. 8 is an exemplary user interface for generating a glossary, consistent with a disclosed embodiment.

FIG. 8 is an exemplary user interface 800 for generating a glossary, consistent with a disclosed embodiment. For example, to generate a glossary suitable for inclusion in a document, a user may select an "All Terms" tab from user interface 400 to cause the display of user interface 800. A user may select a "Definitions" column 802 to sort terms appearing in a document by those having custom definitions. The custom definitions may be included in, for example, a file stored on one of terminals 130 and 140 and/or accessible from server 110 over network 150. Creation of a file storing custom definitions is discussed below in further detail.

The user may select terms that have an "X" in "Definitions" column 802 to mark them for inclusion in the report. The selection process can be accomplished using an input device such as a mouse, position an associated cursor, or pointer and depressing a key on the mouse one or more times. For example, to select terms, a user may highlight or select one term or may select a plurality of terms (e.g., a user may highlight a list of terms). Next, the user may select "Report" button 804 to generate a custom glossary. For example, report module 212*f* may cause user interface 700 to display, which includes a set of check boxes for specifying the types of references to include in the report. For a custom glossary, the user may select the "Definitions" checkbox. After selecting which types of references to include, the user may select "OK" button 702 to generate the glossary. For example, report module 212*f* may create a new document containing a report that includes only words with custom definitions.

Managing Custom Dictionaries

A user may create and maintain custom dictionaries to include custom definitions for terms appearing within a document. To create a custom dictionary, a user may create a file using a word processing application (e.g., an application for preparing a text file). For a text file, the user may indicate a name for the dictionary on the first line of the file. After inserting a line break, the user may then type each word and definition in a particular format. For example, the user may type words and definitions in the following format: [word]: [definition], i.e., the word followed by a colon and then the definition. Alternatively, a user may create a file using the XML markup language.

Figure 9:
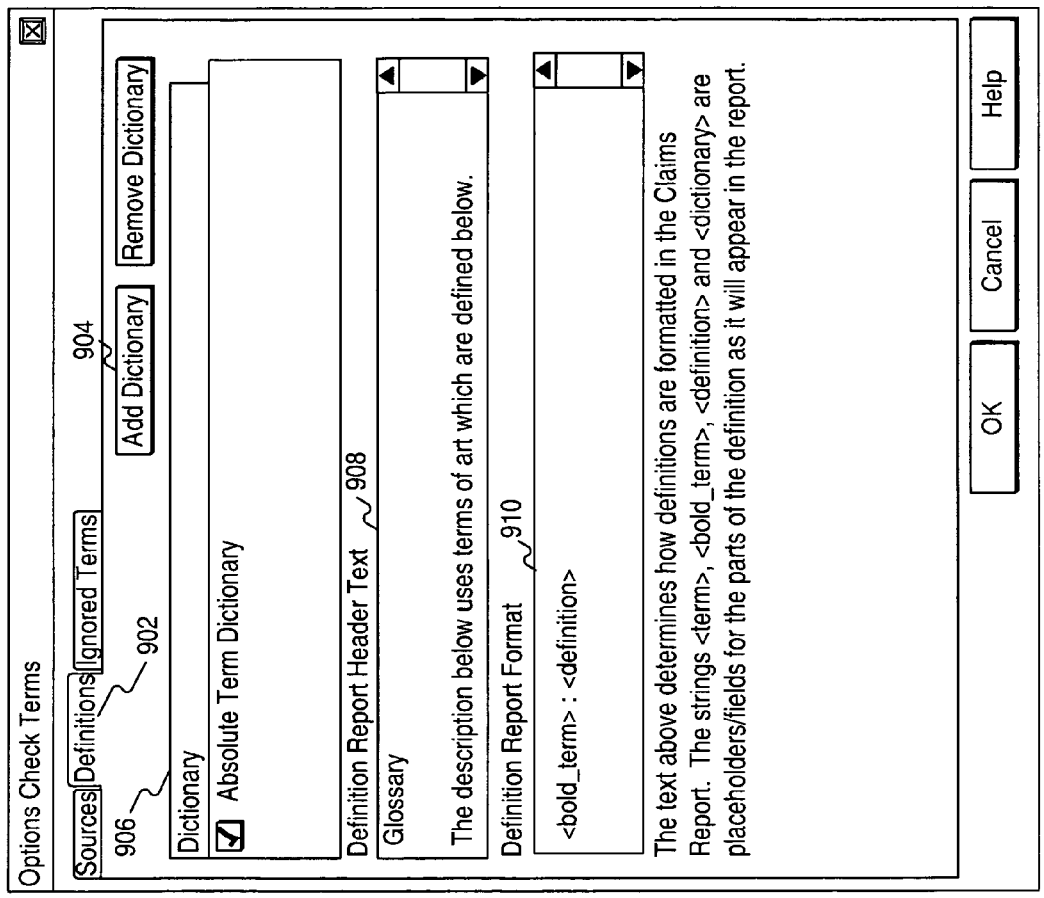
FIG. 9 is an exemplary user interface for checking terms of a document, consistent with a disclosed embodiment.

To import a custom dictionary, a user may select, for example, "Check Terms" button 302 from toolbar 300. Check terms module 212*a* may display user interface 400, as shown in FIG. 4. A user may selection "Options" button 408. Next, check terms module 212*a* may cause a user interface 900 for checking terms, as shown in FIG. 9, to display. The user may select a "Definitions" tab 902 of user interface 900. By selecting an "Add Dictionary" button 904, the user may select a path of a storage location for a file including a custom dictionary. Check terms module 212*a* may then add the custom dictionary to list 906 (e.g., the custom dictionary may be identified in list 906 by the name given in the first line of the file). Furthermore, the user may select or deselect the dictionary for use in a particular document (e.g., by selecting a check box).

A user may also provide a header for a dictionary report to be generated. For example, as shown in user interface 900, a "Definition Report Header Text" field 908 specifies a name (e.g., "Glossary") and includes introductory text (e.g., "The description below uses terms of art which are defined below."). The user may also configure the appearance of the terms and definitions that will appear in the glossary. Furthermore, the user may include additional text and/or other formatting to appear with the terms and definitions. For example, a "Definition Report Format" field 910 indicates that the term should appear in bold (e.g., <bold_term>), followed by a colon, then the definition (e.g., <definition>). A user may configure the format as desired, such as including the term in regular type (e.g., <term>). Furthermore, the user may add any accompanying text with the terms and definitions. For example, a user may include text indicating, "In this document, the term <term>shall mean <definition>." Accordingly, for each term, the sentence may be completed with the term and its definition.

A custom dictionary may be used to generate a glossary, as discussed above. Furthermore, a user may load a custom dictionary to detect the use of certain terms or words in a document. For example, a user drafting or analyzing a patent application may wish to avoid (or locate) the use of certain words in the document that may have special meaning and/or may limit the meaning of the document.

Viewing a Hierarchy of Elements Appearing in a Document

Consistent with disclosed embodiments, a user may visually navigate elements of a document in a hierarchy. For example, the claims of a patent or patent application may be displayed as a hierarchy and include elements of the claims in the hierarchy. Although the following discussion pertains to a patent or patent application, one of ordinary skill in the art will recognize that the following may apply to any kind of document.

Figure 10:
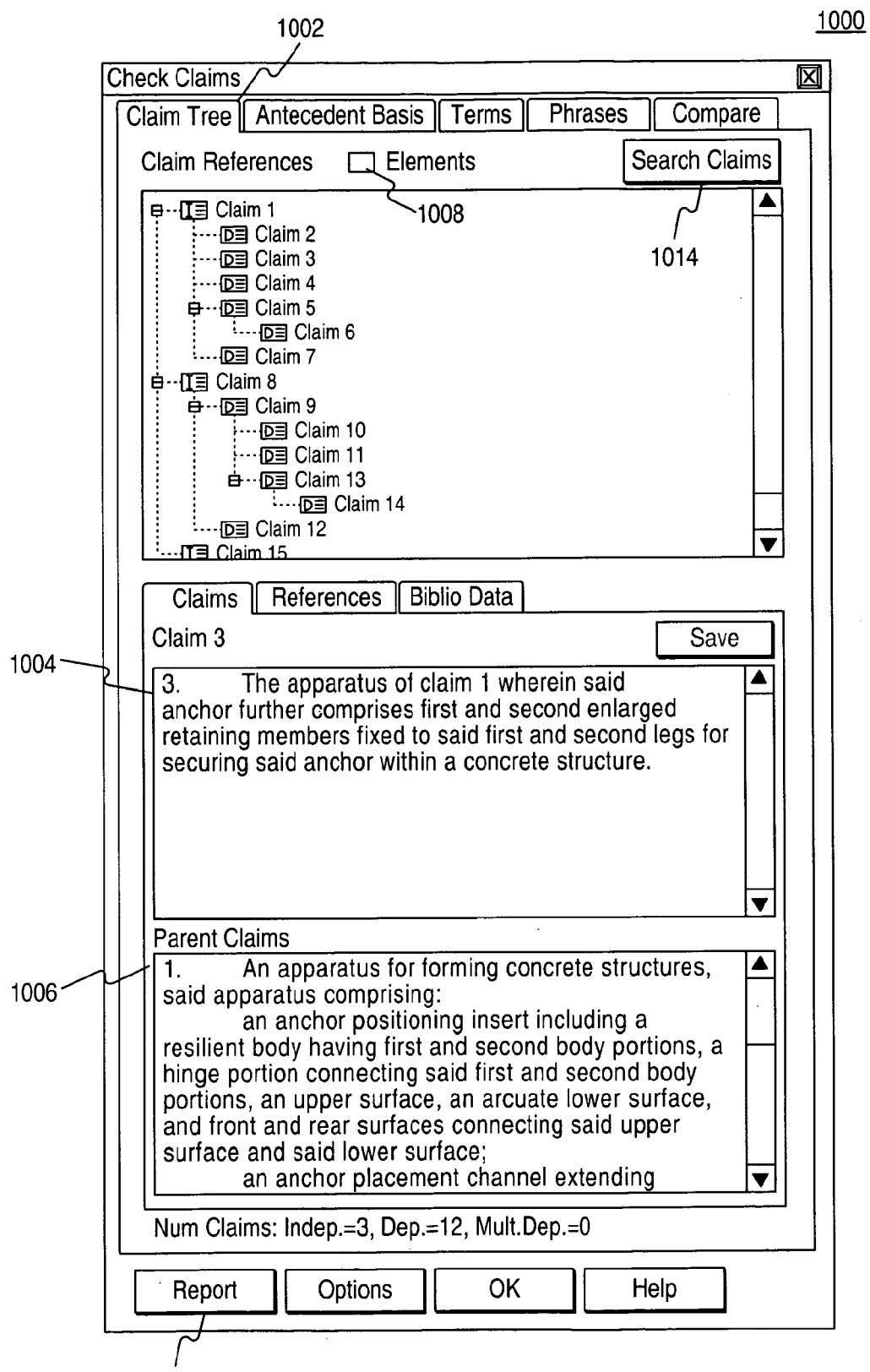
FIG. 10 is an exemplary user interface for displaying a visual representation of a patent claim hierarchy, consistent with a disclosed embodiment.

To view a hierarchy, the user may select, for example, "Check Claims" button 304 from toolbar 300. Check claims module 212b may display user interface 1000 for displaying a visual representation of a claim hierarchy, as shown in FIG. 10. User interface 1000 may include a "Claim Tree" tab 1002, which may include a claim tree in a visual representation. By selecting a claim displayed in "Claim Tree" tab 1002, check claims module 212b may cause a word processing program or an Internet browser to jump to a location of the claim in a document. Furthermore, text of the claim may be displayed in a "Claim" window 1004. Any parent claims may be displayed in a "Parent Claim" window 1006. Each claim may be marked with a small icon including a code. For example, an "I" code may indicate an independent claim. That is, an independent claim is a claim that does not refer to any other claim and is so determined to be a primary (i.e., a parent claim). A "D" code may indicate a dependent claim, which refers to another claim and is so determined to be a dependent (i.e., a child claim). An "M" code may indicate a multiple dependent claim, which is a child claim that refers to more than one claim in the claim tree. These icons may appear in a particular color (e.g., red) or with an icon. Furthermore, icons that include an "X" may indicate an improper multiple dependent claim (e.g., a multiple dependent claim that is dependent upon a multiple dependent claim).

Any of the user interfaces discussed herein may be displayed with or may include a window displaying a document. An application (e.g., a word processing application or an Internet browser) may concurrently execute and display the document along with the user interfaces. For example, user interface 1000 may be displayed alongside a window for a document that is being displayed by a word processing application. Furthermore, as indicated above, a user may select a claim displayed in "Claim Tree" tab 1002 and check claims module 212b may cause the word processing application to locate and display a portion of the document in which the claim appears.

Figure 11:
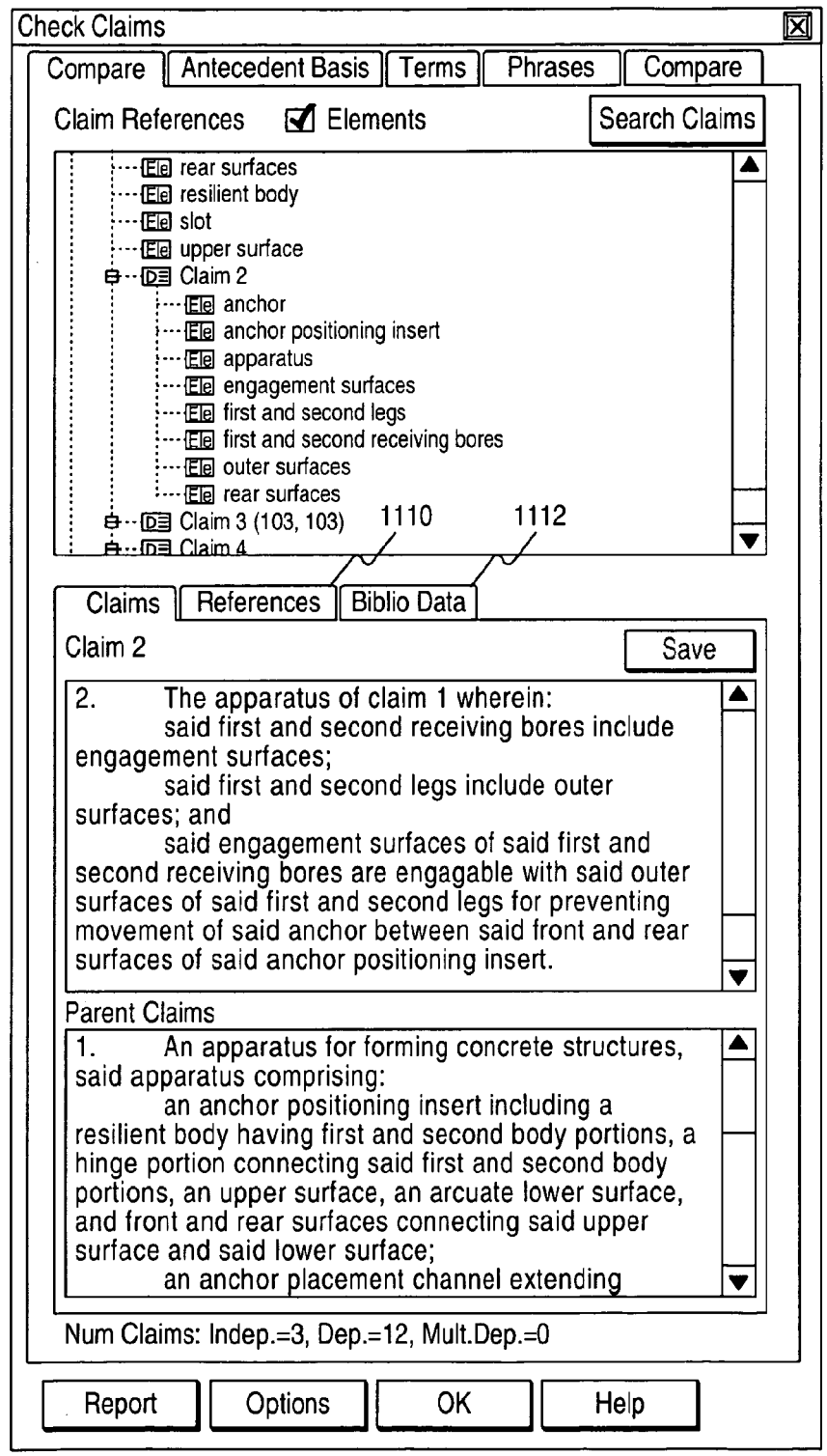
FIG. 11 is an exemplary user interface for displaying a elements of patent claims, consistent with a disclosed embodiment.

To view elements of a document, such as claims in a patent or patent application, a user may select or click an "Elements" checkbox 1008 until a check appears in the box. Elements appearing in each claim may be displayed in the claim tree, as shown in FIG. 11. Furthermore, the user may expand the list of elements that appear in each claim by, for example, double-clicking the claim in the claim tree. Double-clicking the claim again may collapse the list of elements appearing in each claim.

FIG. 11 shows a user interface 1100 displaying elements of claims, consistent with a disclosed embodiment. As shown, elements appearing in each claim are displayed in the claim tree. As discussed above, the user may expand the list of elements that appear in each claim by, for example, double-clicking the claim in the claim tree.

To edit saved research information for individual claims and claim elements, a user may navigate to the reference to edit using the arrows at the top of a "References" tab 1110. For example, selecting "References" tab 1110 may display fields in which information associated with the claim element may be edited and saved. "References" tab 1110 may associate reference data with a particular claim, for example. Reference data from a source may be displayed by "References" tab 1110. For example, claim 3 in user interface 1110 includes a notation "(103, 103)." This may indicate that reference data is available for claim 3. Thus, selecting claim 3 in the claim tree and selecting "References" tab 1110, a user may view the reference data for claim 3, which may pertain to section 103 of the patent laws, for example.

Furthermore, using "References" tab 1110, a user may define a "type" label for the reference data. As discussed above, claim 3 includes a notation "(103, 103)." A user may define an appropriate notation for any reference data. Furthermore, a user may include and save any notes in association with reference data using "References" tab 1110.

To view saved bibliographic information for research of individual claims and claim elements, the user may click a "Biblio Data" tab 1112. Any bibliographic data previously saved appears within fields included in "Biblio Data" tab 1112. For example, bibliographic data for research may be automatically populated into "Biblio Data" tab 1112 and be stored in association with related reference data. The bibliographic data may include a title of a document, author, storage location (e.g., URL), capture date, etc.

To generate a report of claims section term and phrase usage, a user may select a claim to research, as shown in user interface 1000, and select "Report" button 1016. Report module 212f may generate a user interface (not shown) including a list of options to include a report. The user may select one or more of the options. For example, report module 212f may create a new document containing any of the following data categories, as specified by a user: the number of claims (e.g., total numbers of independent, dependent, and multiple dependent claims), a claim tree (e.g., showing claim relationships), a claim chart (e.g., summarizing claim relationships), references to bibliographic data, reference data, etc. For example, a user may generate a report for a claim element and the report may include reference data captured for that element, along with a user's notes and related bibliographical data associated with the reference data.

Figure 12:
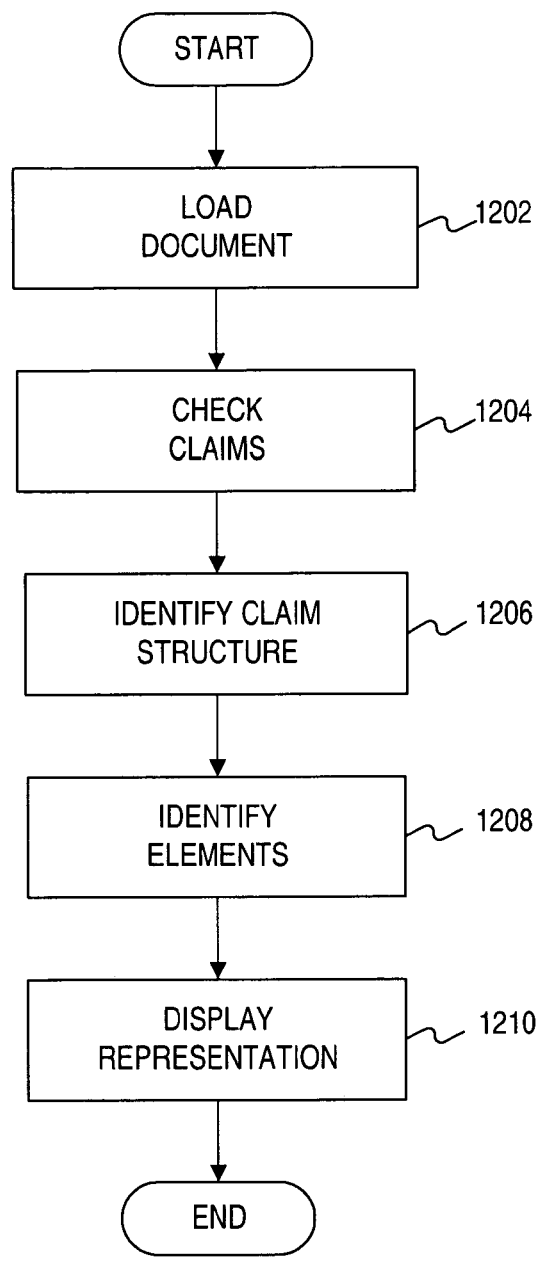
FIG. 12 is a flow diagram of an exemplary method for viewing elements of patent claims in a visual representation, consistent with a disclosed embodiment.

FIG. 12 is a flow diagram 1200 of an exemplary method for viewing elements of claims in a hierarchical visual representation, consistent with a disclosed embodiment. In step 1202, a document is loaded into an application (e.g., a word processing application or an Internet browser). Next, in step 1204, a user selects an option to check claims (e.g., by selecting "Check Claims" button 304). In step 1206, check claims module 212b may identify the claims and claim structure in the document.

Furthermore, check claims module 212b may determine claim dependencies. For example, check claims module 212b may analyze a claim 2, which refers to a claim 1 and, accordingly, conclude that claim 2 depends from claim 1. As shown, for example, claim 2 recites, in relevant part, "The apparatus of claim 1 . . . " In step 1208, check claims module 212b may identify elements of each claim. In step 1210, check claims module 212b may display a claim tree that includes elements of each claim.

Researching Elements of a Document

Consistent with disclosed embodiments, a user may research elements of a document, select text from various sources, and create notes for each element. The following discussion, as an example, pertains to claims of a patent or patent application. However, the following may pertain to research elements of any kind of document.

To research the elements of a document, a user may select a claim to research in a document and select "Search Claims" button 1014 from user interface 1000. Check claims module 212b may cause a user interface 1300 to display, as shown in FIG. 13.

Figure 13:
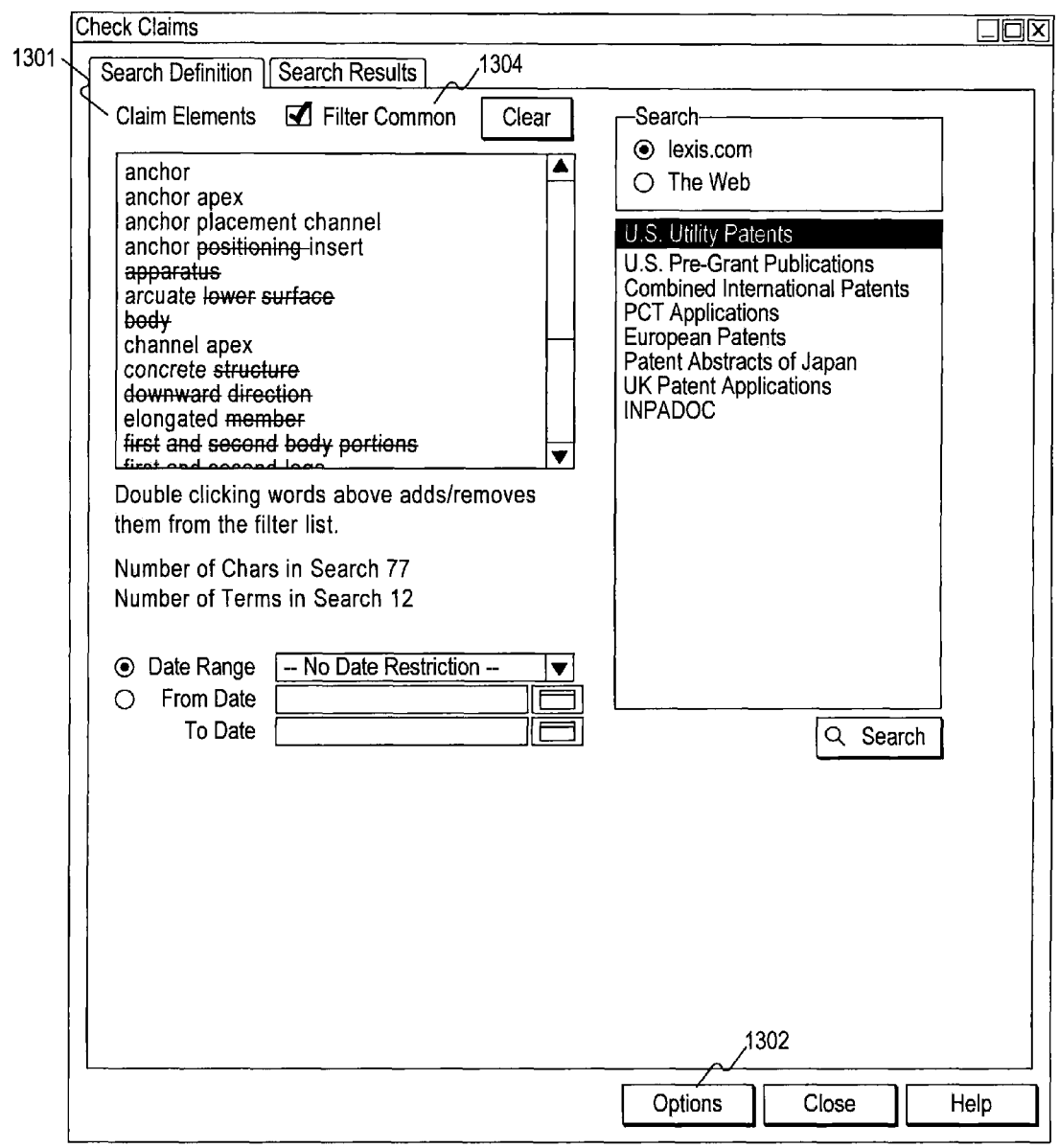
FIG. 13 is an exemplary user interface for researching elements of a document, consistent with a disclosed embodiment.

FIG. 13 shows user interface 1300, which may include elements that appearing in a "Claim Elements" field 1301. A user may select one or more claim elements from one or more claims. Furthermore, the user may select a type of search to perform. For example, the user may search a particular database by selecting a radio button. When performing a search, the user may set date restrictions, as shown in user interface 1300. The user may also select a "Filter Common" checkbox 1304 to filter common terms generally and/or common terms used in patents prior to searching. Search results may be associated with particular claims and/or claim elements. For example, when selecting "References" tab 1110, a user may view any data, including search results, associated with a claim and/or claim element. Furthermore, the user may select "Options" button 1302 to specify a user-defined "type" label for the reference data, as discussed above in connection with FIG. 11. A user may specify a long name associated with the reference data and/or a display name (e.g., a shorthand notation) for display in, for example, user interface 1100.

Comparing Elements, Terms, and Phrases Across Documents

Consistent with disclosed embodiments, a user may compare elements, terms, and phrases that appear in multiple documents or multiple versions of a document. By comparing multiple documents, a user may quickly identify differences between the documents. For example, a user may open a first document for comparison with an application (e.g., a word processing application or an Internet browser). A user may select "Compare Claims" button 308, which will mark the document for comparison. Compare claims module 212*d* may display a dialog prompting the user to add one or more additional documents. Next, the user may access a second document to compare and select "Compare Claims" button 308 to mark the second document for comparison. The document is marked for comparison. Compare claims module 212*d* may display a dialog indicating that the document has been added to the list of documents for comparison.

Once the user has added the desired number of documents using the above process and "Compare Claims" button 308, the user may select a "Compare Now" button from a user interface (not shown) listing the documents for comparison. Compare claims module 212*d* may display a comparison of the selected documents.

Figure 14:
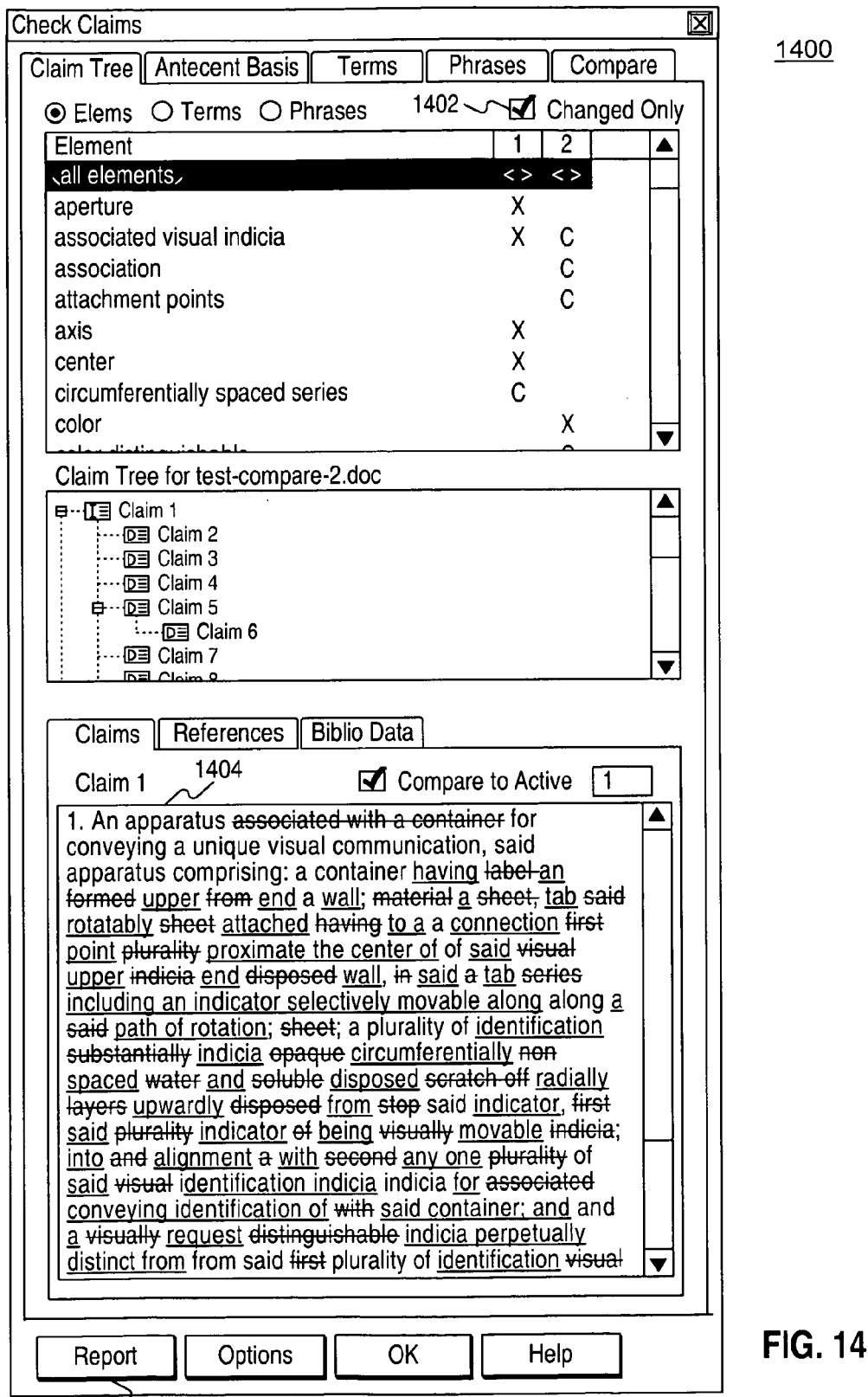
FIG. 14 is an exemplary user interface for displaying a comparison between documents, consistent with a disclosed embodiment.

FIG. 14 is an exemplary user interface 1400 for displaying a comparison between documents, consistent with a disclosed embodiment. For example, information for a most recently added document may appear in a column numbered "1". Information for the next most recently added document may appear in a column numbered "2". The user may view a name of the file being referenced by placing, for example, a cursor over the column number of interest. Elements, terms, or phrases appearing in all documents being compared, appear in a single column in comparison section 1202. Letters, indicating where those elements, terms, or phrases appear, may be included in the numbered columns. Furthermore, any variety of coding scheme may be used to represent differences between documents. For example, for a patent or patent application, a letter "C" may indicate that the term, phrase, or element only appears in claims section within the document. A letter "D" may indicate that the term, phrase, or element only appears in the description section. A letter "X" may indicate that the term, phrase, or element appears in both the description and claims sections.

As discussed above, an application (e.g., a word processing application or an Internet browser) may concurrently execute and display the document along with the user interfaces. For example, user interface 1400 may be displayed alongside a window for a document that is being displayed by a word processing application. Furthermore, a user may select (e.g., by clicking a pointing device) a term, phrase, or element from the list appearing in user interface 1400. Compare claims module 212*d* may then cause the word processing application to display a portion of the document in which the selected term, phrase, or element appears. The selected term, phrase, or element may be accented or highlighted. Furthermore, a user may make a subsequent selection of the term, phrase or element (e.g. by clicking the pointing device again). Compare claims module 212*d* may cause the word processing application to display a subsequent occurrence of the selected term, phrase or element.

A user may view a hierarchy for a document being compared, as shown in FIG. 14. Furthermore, to view only elements, terms, or phrases that are used differently in the documents being compared, a user may click within a "Changed Only" checkbox 1402. Accordingly, elements, terms, and phrases that are not used similarly in the documents being compared will be displayed. A comparison between a selected claim and a corresponding claim from an active document may be displayed claim field 1404. Any words that do not appear in the active claim may be crossed out, and any words that do appear in the active claim but do not appear in the selected claim may appear as underlined text. Furthermore, the user may generate a report of comparisons across documents by selecting "Report" Button 1406. A new document may be generated containing comparison information for the documents that were selected.

Furthermore, a user may select one of the elements appear in user interface 1400. For example, the user may select the element "center" that appears in the exemplary list of elements shown at the top of user interface 1400. Upon selecting the element "center," the claim tree window may display the selected element (e.g., "center") next to or with a corresponding claim number in which the element appears. For example, if the word "center," appears in claim, the word "center" may appear after "Claim 5." Furthermore, after selecting element "center," claim field 1404 may display claim 5, which includes the element "center." In addition, the occurrence of the word center in claim 5 in claim 1404 may be accented or shown in bold. Selecting an element from user interface 1400 may also cause compare claims module 212*d* to cause an application (e.g., a word processing application or an Internet browser) to display a portion of the document in which the selected term, phrase, or element appears in a window shown with user interface 1400.

Inserting Numbers for Unnumbered Parts

Figure 15:
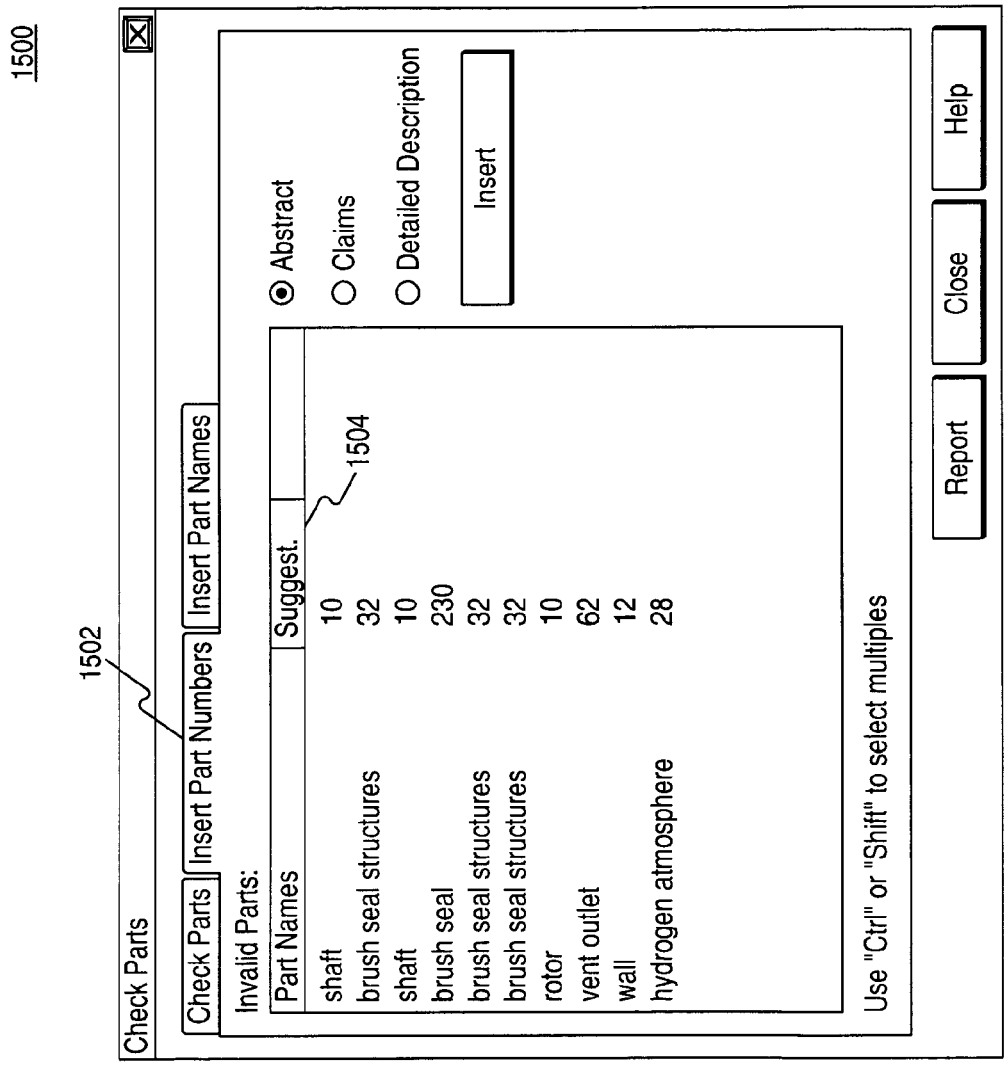
FIG. 15 is an exemplary user interface for inserting numbers for unnumbered parts in a document, consistent with a disclosed embodiment.

FIG. 15 is an exemplary user interface 1500 for inserting numbers for unnumbered parts in a document, consistent with a disclosed embodiment. After selecting "Check Parts" button 306, check parts module 212*c* may display user interface 1500. User interface 1500 may include an "Insert Part Numbers" tab 1502. Check parts module 212*c* may determine and suggest numbers for detected unnumbered parts, and allow a user to insert the suggested numbers into a document. For example, "Insert Part Numbers" tab 1502 may display a list of parts missing part numbers. Recommended part numbers may appear in a "Suggested Part Number" column 1504. The suggestions may be based upon numbers used for parts of the same name within the same document (e.g., patent, patent application, etc.). A user may select a radio button corresponding to a section of a document in order to check for unnumbered parts. For example, in a patent application or patent, a user may check for unnumbered parts of an abstract, claims, or detailed description section. Furthermore, consistent with the above discussion, check parts module 212*c* may further check for unnumbered parts in a drawings section. For example, check parts module 212c may use optical character recognition (OCR) to identify numbers included in the drawings.

Using Placeholders for Part Names

Figure 16:
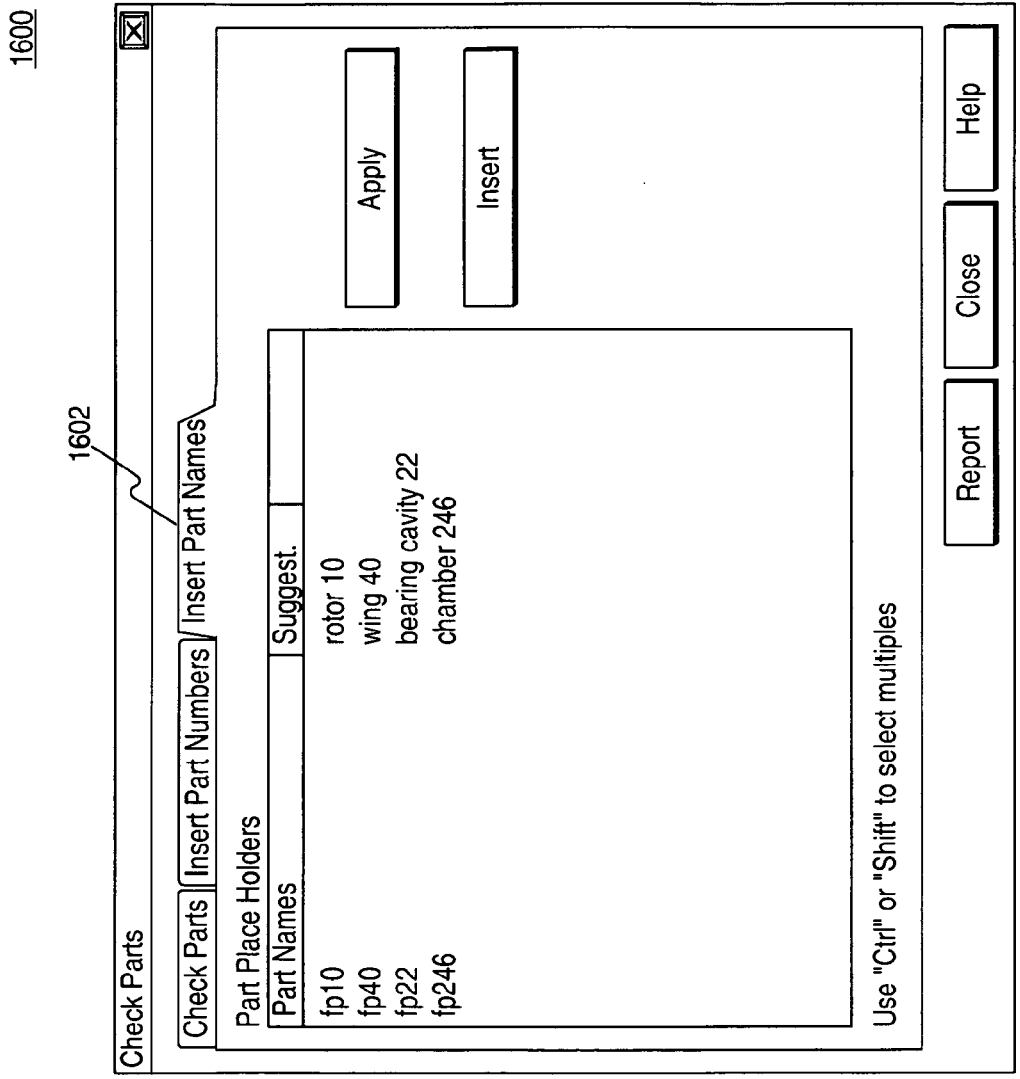
FIG. 16 is an exemplary user interface for using placeholders for part names, consistent with a disclosed embodiment.

FIG. 16 shows an exemplary user interface 1600 for using placeholders for part names, consistent with a disclosed embodiment. As shown in FIG. 16, an "Insert Part Names" tab 1602 may allow a user to use placeholders as substitutes for part names, particularly parts that have long and/or complex names. The part should appear, complete with part name and number, at least once within the document. For example, in a document, a user may type a part prefix followed by a number for the part. For example, a default part prefix is "fp." Accordingly, "fp10" would indicate a placeholder for part 10. Check parts module 212c may analyze parts descriptions, identifying parts and their various descriptions and references, and organize them into a table, as shown in FIG. 16. For example, a placeholder list may display placeholders used within the document. A user may select one or more placeholders to replace with a corresponding part name and number.

Checking Measurements

Consistent with disclosed embodiments, a check measurements function may analyze a document for commonly used measurements (e.g., area, length, speed, temperature, volume, and weight) appearing in the document and suggest an appropriate metric or English unit when both are not included. For example, A user may select "Check Measurements" button 310 from toolbar 300. A list of all detected commonly used measurements appearing within a document may be displayed, as shown in FIG. 17.

Figure 17:
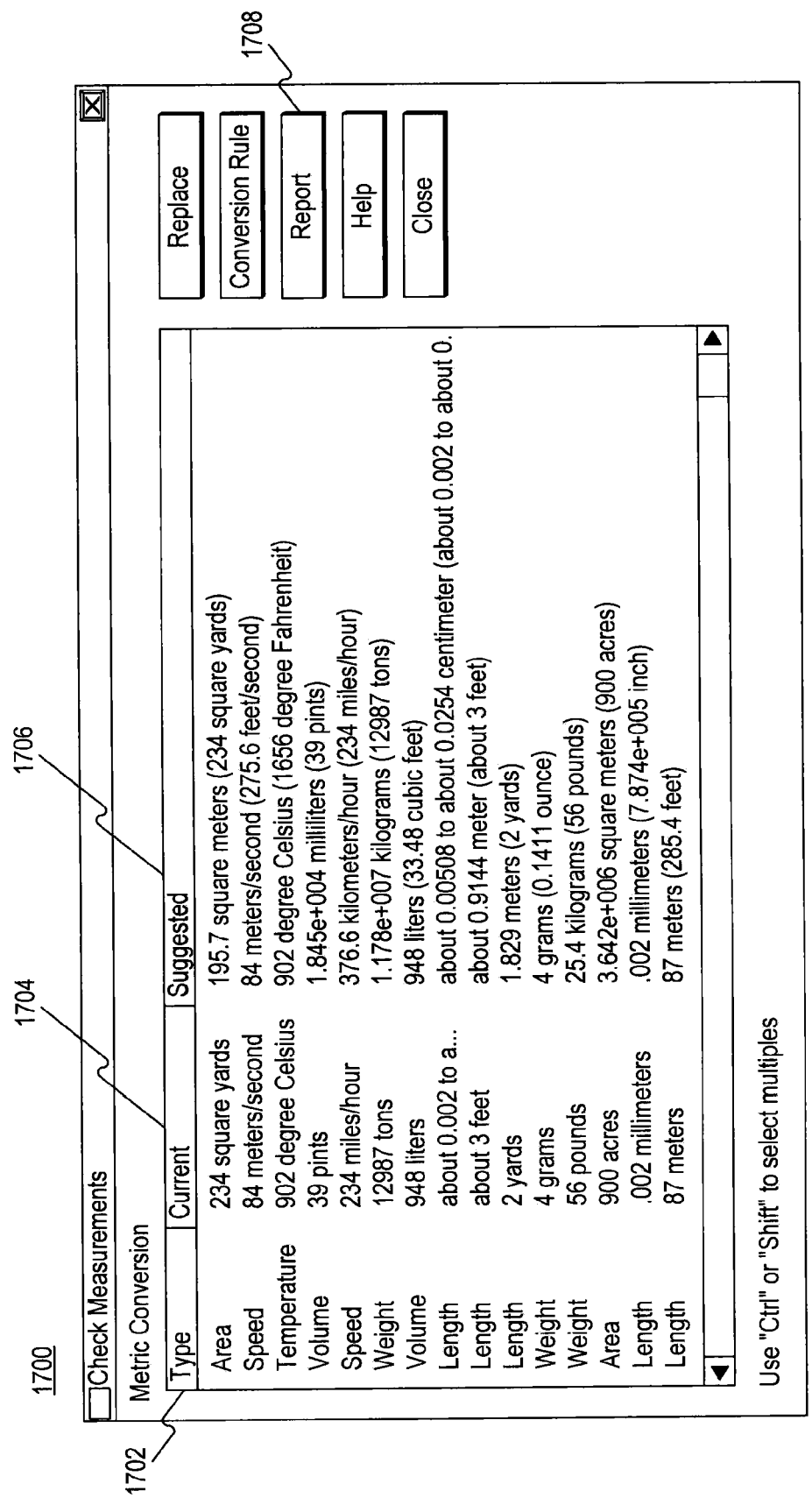
FIG. 17 is an exemplary user interface for checking measurements in a document, consistent with a disclosed embodiment.

FIG. 17 is an exemplary user interface 1700 for checking measurements, consistent with a disclosed embodiment. As shown in user interface 1700, a "Type" column 1702 may list which kind of unit the measurement is (e.g., area, length, speed, temperature, volume, or weight). A "Current" column 1704 may list the measurements that currently appears in the document. A "Suggested" column 1706 may list a replacement measurement that is suggested for a measurements (both English and metric). Check measurements module 212e may convert measurements from one measurement system to another measurement system (e.g., from English units to metric units). Check measurements module 212e may also insert into a document having a measurement expressed in one measurement system a conversion of the measurement into another measurement system. Furthermore, a user may create a report of the commonly used measurements that appear in a document by selecting "Report" button 1708. Check measurements module 212e may generate a new document of the detected commonly used measurements that appear in the document.

A document may include a measurement in a first measurement system and may also include a corresponding correction to a second measurement system. Check measurements module 212e may detect incorrect measurement conversions in a document that includes a measurement expressed in both units of a first measurement system and units of a second measurement system. Furthermore, check measurements module 212e may identify in user interface 1700 a measurement having an incorrect conversion. For example, a measurement "Current" column 1704 may list the measurement as it currently appears in the document in a particular color, font, or with an icon indicating that an error was detected. A user may then insert a correction into the document for the measurement that was not properly converted.

Furthermore, a user may specify a conversion rule to convert from an original measurement in a first unit to an equivalent measurement in a second unit. For example, for a measurement of a particular type (e.g., length), a user may specify a conversion rule to convert from a first unit (e.g., meters) to a second unit (e.g., inches). Conversion rules may apply to various types of measurements (e.g., area, length, speed, etc.) and a user may specify a display order of the conversion (i.e., the order in which the measurement in the first and second units will appear in the document). A user may edit a conversion rule by selecting an original unit from, for example, a user interface (not shown) listing types of measurements and corresponding first units (e.g., "From Unit") and second units (e.g., "To Unit"). The user may select, for example, an original unit and select from, for example, a list of options, a unit in which to the convert the measurement.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described for being stored in memory, these aspects can also be stored on other types of computer readable media, such as secondary storage devices, for example, hard disks, floppy disks, CD ROM, or other forms of RAM or ROM.

Computer programs based on the written description and methods of this invention are within the skill of an experienced developer. The various programs or program modules can be created using any of the known techniques or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed routines may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for analyzing a patent application and providing a visual representation, the method comprising:
 displaying, by a processing device, claims of the patent application in a claim tree hierarchical structure on a display, wherein the claim tree hierarchical structure visually depicts relationships between the claims;
identifying one or more words of at least one of the claims that constitutes one or more elements;
displaying, in the claim tree hierarchical structure, the words constituting the one or more elements in association with the claims;
loading, into a memory, at least one database storing patents, patent applications, and court opinions that relates to the patents or the patent applications;
searching the at least one database for a selected element from one or more elements in association with the claims, wherein the results of the search indicate that the selected element has a defined prior usage in patents or patent applications with earlier priority dates stored in the at least one database and corresponding case reference information in court opinions stored in the at least one database, the defined prior usage informing how the selected element has been used in the patents or patent applications with earlier priority dates to provide a meaning of the selected element, and the case reference information indicating how the selected element has been interpreted by courts; and
displaying the selected element with a first visual indication indicating that the selected element has been used in the patents or patent applications with earlier priority dates from the at least one database, and a second visual indication indicating that the selected element has been interpreted by courts.

2. The method of claim 1, further comprising:
displaying one or more suggested alternate terms for the selected element.

3. The method of claim 1, wherein the first visual indication and the second visual indication are a text color, font, or an icon.

4. The method of claim 1, further comprising:
storing, in association with the selected element, results of the search.

5. The method of claim 1, further comprising:
displaying results of the search in association with the claim tree hierarchical structure.

6. The method of claim 1, further comprising:
generating a report of results of the search.

7. The method of claim 1, further comprising:
providing an option to associate reference data with the selected element.

8. The method of claim 7, further comprising:
displaying bibliographic data in association with the reference data and the selected element.

9. The method of claim 8, wherein the bibliographic data is automatically stored in association with the reference data.

10. The method of claim 8, further comprising:
generating a report for at least the selected element, the report including one or more of the reference data and the bibliographic data that is associated with the selected element.

11. The method of claim 1, further comprising:
displaying a label or icon indicating that reference data is available for the selected element.

12. The method of claim 11, further comprising: receiving a selection to view the reference data; and displaying the reference data.

13. The method of claim 1, further comprising:
displaying, in association with at least one of the claims, a designation indicating whether the at least one of the claims is independent, dependent, or multiple dependent; and
generating a report of the claims, the report comprising a number of the claims, a claim tree, and a claim chart summarizing claim relationships.

14. A system for analyzing a patent application and providing a visual representation, the system comprising:
a processing device; and
a non-transitory, processor-readable storage medium, the non-transitory, processor-readable storage medium comprising one or more programming instructions that, when executed, cause the processing device to:
display claims of the patent application in a claim tree hierarchical structure on a display, wherein the claim tree hierarchical structure visually depicts relationships between the claims;
identify one or more words of at least one of the claims that constitutes one or more elements;
display the words constituting the one or more elements in association with the claims;
load at least one database storing patents, patent applications, and court opinions that relates to the patents or the patent applications;
search the at least one database for a selected element from one or more elements in association with the claims, wherein the results of the search indicate that the selected element has a defined prior usage in patents or patent applications with earlier priority dates stored in the at least one database and corresponding case reference information in court opinions stored in the at least one database, the defined prior usage informing how the selected element has been used in the patents or patent applications with earlier priority dates to provide a meaning of the selected element, and the case reference information indicating how the selected element has been interpreted by courts; and
display the selected element with a first visual indication indicating that the selected element has been used in the patents or patent applications with earlier priority dates from the at least one database, and a second visual indication indicating that the selected element has been interpreted by courts.

15. The system of claim 14, wherein the non-transitory, processor readable storage medium further comprises one or more programming instructions that, when executed, cause the processing device to:
display one or more suggested alternate terms for the selected element.

16. The system of claim 14, wherein the first visual indication and the second visual indication are a text color, font, or an icon.

17. The system of claim 14, wherein the non-transitory, processor readable storage medium further comprises one or more programming instructions that, when executed, cause the processing device to:
store, in association with the selected element, results of the search.

18. The system of claim 14, wherein the non-transitory, processor readable storage medium further comprises one or more programming instructions that, when executed, cause the processing device to:
display results of the search in association with the claim tree hierarchical structure.

19. The system of claim 14, wherein the non-transitory, processor readable storage medium further comprises one or more programming instructions that, when executed, cause the processing device to:
generate a report of results of the search.

20. The system of claim 14, wherein the non-transitory, processor readable storage medium further comprises one or more programming instructions that, when executed, cause the processing device to:

provide an option to associate reference data with the selected element.

21. The system of claim 20, wherein the non-transitory, processor readable storage medium further comprises one or more programming instructions that, when executed, cause the processing device to:

display bibliographic data in association with the reference data and the selected element.

22. The system of claim 21, wherein the bibliographic data is automatically stored in association with the reference data.

23. The system method of claim 20, wherein the non-transitory, processor readable storage medium further comprises one or more programming instructions that, when executed, cause the processing device to:

generate a report for at least the selected element, the report including one or more of the reference data and the bibliographic data that is associated with the selected element.

24. The system of claim 14, wherein the non-transitory, processor readable storage medium further comprises one or more programming instructions that, when executed, cause the processing device to:

display a label or icon indicating that reference data is available for the selected element.

25. The system of claim 24, wherein the non-transitory, processor readable storage medium further comprises one or more programming instructions that, when executed, cause the processing comprising: receive a selection to view the reference data; and display the reference data.

26. The system of claim 14, wherein the non-transitory, processor readable storage medium further comprises one or more programming instructions that, when executed, cause the processing device to:

display, in association with at least one of the claims, a designation indicating whether the at least one of the claims is independent, dependent, or multiple dependent; and generate a report of the claims, the report comprising a number of the claims, a claim tree, and a claim chart summarizing claim relationships.

* * * * *